(12) United States Patent
Lachapelle

(10) Patent No.: US 8,600,692 B2
(45) Date of Patent: Dec. 3, 2013

(54) AUTOMATICALLY CONFIGURABLE SENSING DEVICE

(75) Inventor: Denis Lachapelle, Repentigny (CA)

(73) Assignee: Sysacom, Le Gardeur, Quebec (CA)

( * ) Notice: Subject to any disclaimer, the term of this patent is extended or adjusted under 35 U.S.C. 154(b) by 336 days.

(21) Appl. No.: 13/050,407

(22) Filed: Mar. 17, 2011

(65) Prior Publication Data

US 2012/0239335 A1 Sep. 20, 2012

(51) Int. Cl.
*G06F 19/00* (2011.01)
(52) U.S. Cl.
USPC .............. 702/98; 702/183; 714/21; 714/37; 709/219; 709/220; 709/221; 709/223; 713/1; 713/2; 713/100; 713/191
(58) Field of Classification Search
USPC ......... 702/98, 183; 714/21, 37; 709/219, 220, 709/221, 223; 713/1, 2, 100, 191
See application file for complete search history.

(56) References Cited

U.S. PATENT DOCUMENTS

| | | | |
|---|---|---|---|
| 6,671,802 B1 * | 12/2003 | Ott | 713/100 |
| 7,266,594 B2 * | 9/2007 | Kumbalimutt et al. | 709/221 |
| 7,441,035 B2 * | 10/2008 | Lakshmi Narayanan et al. | 709/227 |
| 7,496,739 B1 * | 2/2009 | Raghavan et al. | 713/1 |
| 7,827,009 B2 * | 11/2010 | Kunkel | 702/188 |
| 8,365,018 B2 * | 1/2013 | McIntosh et al. | 714/23 |
| 8,393,207 B2 * | 3/2013 | Fujisawa et al. | 73/152.24 |
| 2005/0080882 A1 * | 4/2005 | Philyaw et al. | 709/220 |
| 2007/0206690 A1 * | 9/2007 | Sperschneider et al. | 375/260 |
| 2011/0007907 A1 * | 1/2011 | Park et al. | 381/71.8 |
| 2012/0053901 A1 * | 3/2012 | Arefeen et al. | 702/183 |

OTHER PUBLICATIONS http://web.archive.org/web/20100127094523/http://www.tridium.com/cs/home—archived pages dated Jan. 27, 2010.
http://web.archive.org/web/20101125032105/http://www.can2go.com/index.htm—archived pages dated Nov. 25, 2010.
http://web.archive.org/web/20110202013550/http://www.telenorconnexion.com/—archived pages dated Feb. 2, 2011.
http://web.archive.org/web/20110202165634/http://www.sensinode.com/—archived pages dated Feb. 2, 2011.
http://web.archive.org/web/20110203090818/http://www.numerex.com/—archived pages dated Feb. 3, 2011.

(Continued)

*Primary Examiner* — Carol S Tsai
(74) *Attorney, Agent, or Firm* — Benoît & Côté Inc.

(57) ABSTRACT

The present document describes a ready to use sensing device which is auto-configurable when turned on. The sensing device includes one or more sensors and a communication port. When turned on, the system automatically contacts a central server via the communication port and requests the address of a second server with which the sensing device is associated. Upon receipt of the address of the second server, the sensing device contacts the second server and requests its customized configuration settings. When received, the configuration settings are installed, and the sensing device starts to sample the output of the sensors and sends the samples to the second server for storage. The user may view the measurement data by accessing the second server through the internet. The minimum memory capacity required for operating the sensing device is very low, due to the fact that the samples are sent to the second server every time the samples are taken.

11 Claims, 7 Drawing Sheets

(56) References Cited

OTHER PUBLICATIONS http://web.archive.org/web/20110208130330/http://www.m2mdatacorp.com/ archived pages dated Feb. 8, 2011.
http://web.archive.org/web/20110307080443/http://www.datanab.com/ archived pages dated Mar. 7, 2011.
http://web.archive.org/web/20110312023152/http://www.controlbyweb.com/—archived pages dated Mar. 12, 2011.

* cited by examiner

AUTOMATICALLY CONFIGURABLE SENSING DEVICE

This application is the first disclosure of this subject matter.

BACKGROUND (a) Field

The subject matter disclosed generally relates to a sensing device. More particularly, the subject matter relates to a sensing device for the continuous monitoring of one or more parameters in a measurement site.

(b) Related Prior Art

Several sensing modules are found on the market for measuring the temperature, humidity or other parameters of a measurement site such as a fridge, server room, storage room etc.

These sensing modules require professional installation because they are complicated to configure.

The existing sensing modules take the measurements and store them internally in a local memory. The user may have a remote access to the measurement data in the local memory of the module via a wide/local area network such that Ethernet or the Internet or the like. In order to make the data accessible to the user over the internet, the sensing module has to be equipped with server features. There are a lot of complex configurations to be done to make a server accessible from Internet such as router port forwarding, domain name configuration etc. These configurations increase the complexity and the price of the sensing module.

Depending on the measurement frequency of the sensors in the sensing module, the internal memory may hold the data for few months and then starts to delete the old records for recoding the new ones, and so on. As the size of the memory increases, its size increases and so does the price of the sensing module.

Accordingly, there is a need for a sensing module which is inexpensive and simple to configure.

SUMMARY

According to an aspect, there is provided an auto-configurable sensing device for sensing at least one parameter in a measurement site, said device comprising:
- at least one sensor for sensing a parameter of the measurement site;
- a communication port; and
- a processor having access to statements and instructions which when executed, cause the processor to:
  a. contact a first server requesting an address of a second server, via said communication port;
  b. contact the second server requesting configuration settings;
  c. install said configuration settings;
  d. sample, based on the configuration settings, measurement data received from said at least one sensor; and
  e. send sampled measurement data to said second server for storage.

In an embodiment, the communication port is one of Ethernet port, and a Wi-Fi port.

In another embodiment, the configuration settings include a sampling frequency used for sampling an output of the at least one sensor. The configuration settings may further include firmware configuration of the sensing device.

In yet another embodiment, the at least one sensor includes at least one of temperature sensor, pressure sensor, humidity sensor, radiation sensor, luminosity sensor, contact sensor, and toxic gasses sensor.

Sending the sampled measurement data may be performed each time sample measurement data is taken at the measurement frequency.

In another embodiment, the sensing device contacts the second server periodically for verifying the presence of newer configuration settings.

In an embodiment, the first server selects the second server from a list including a plurality of second servers. The sensing device may be pre-assigned to one of the plurality of second servers.

In a further embodiment, the sensing device acts as a client element in a communication network connecting the first server, the second server and the sensing device.

According to another aspect, there is provided a ready to use sensing device, comprising:
- at least one sensor for sensing a parameter of the measurement site;
- a communication port; and
- an auto-configurable processor adapted to
  a) automatically contact a first server, though said communication port, requesting the address of a second server,
  b) download and install configuration settings from the second server, said configuration settings including sampling frequency;
  c) sample, based on said sampling frequency, measurement data received from said at least one sensor; and
  d) send sampled measurement data to said second server for storage.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The present document describes a ready to use sensing device which is auto-configurable when turned on. The sensing device includes one or more sensors and a communication port. When turned on, the system automatically contacts a central server via the communication port and requests the address of a second server with which the sensing device is associated. Upon receipt of the address of the second server, the sensing device contacts the second server and requests its customized configuration settings. When received, the configuration settings are installed, and the sensing device starts to sample the output of the sensors and sends the samples to the second server for storage. The user may view the measurement data by accessing the second server through the internet. The minimum memory capacity required for operating the sensing device is very low, due to the fact that the samples are sent to the second server every time the samples are taken.

Figure 1:
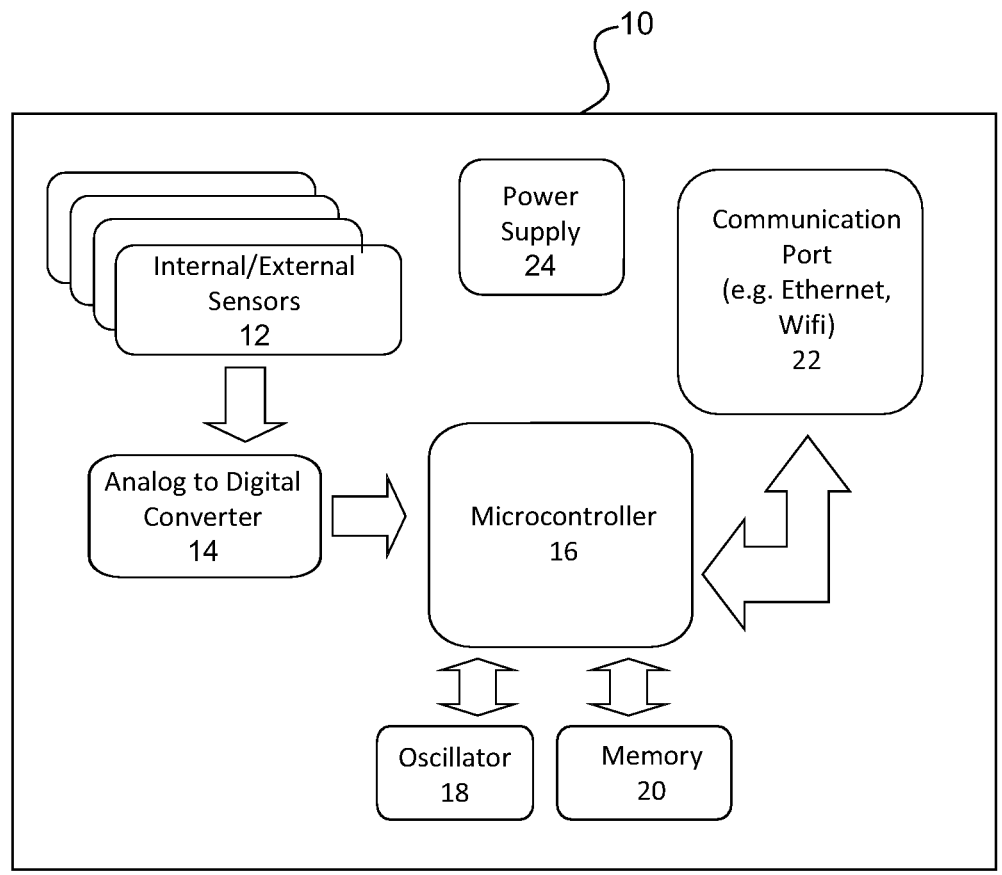
FIG. 1 illustrates a block diagram of a sensing device, in accordance with an embodiment.

FIG. 1 illustrates a block diagram of a sensing device 10, in accordance with an embodiment. The sensing device 10 may include one or more sensors 12 for detecting different parameters of a measurement site such as the temperature, pressure, humidity, radiation, luminosity, contact, the presence of CO or other toxic or non toxic gasses or any other type of sensors.

The measurement data output by the sensors 12 may be digitized using an A/D converter 14 and sent to a microcontroller 16. The microcontroller 16 receives its clock from an oscillator 18. The microcontroller 16 samples the measurement data received from the sensors 12 and stores the data in memory 20 temporarily. The data is then sent via a communication port 22 to a remote server over a wide area network such as the internet. The communication port may be an Ethernet port for connecting to the network via an Ethernet cable, or may include a wireless port such as a Wi-Fi or the like. According to another embodiment, the Wi-Fi transmitter (i.e., circuit and antenna) may be included within the sensing device 10. The sensing device 10 may be powered by a power supply 24. The power supply may be a battery, or an adapter for plugging in a wall outlet, or both thereof.

Figure 2A:
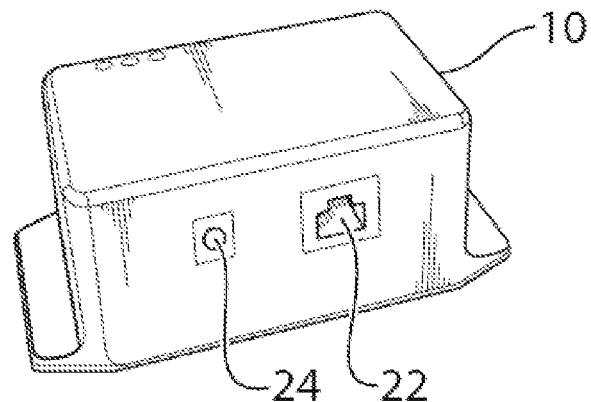
FIG. 2a illustrates an exemplary sensing device with a housing, in accordance with an embodiment.
Figure 2B:
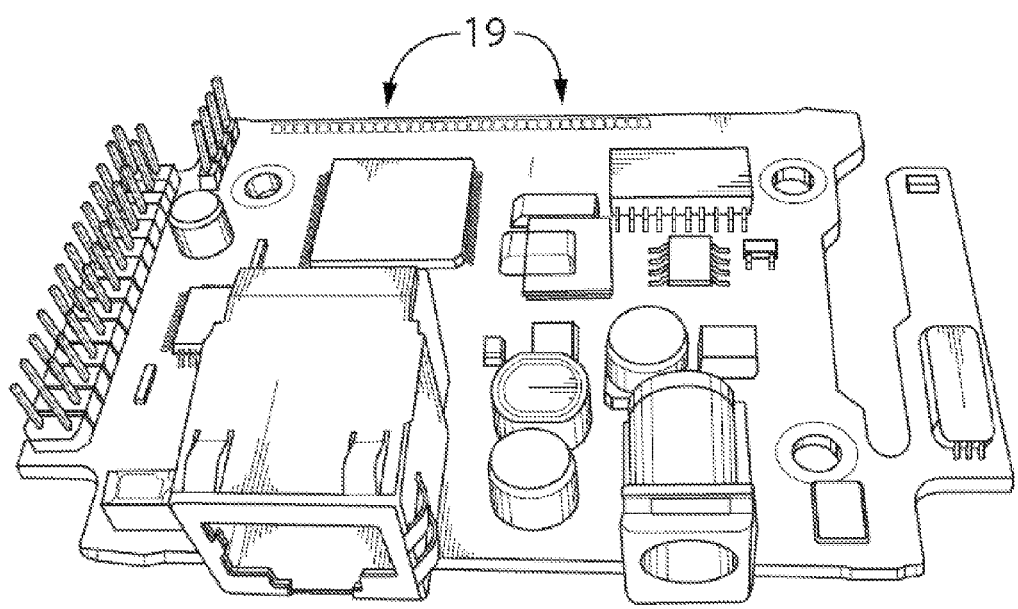
FIG. 2b illustrates a circuit board including a plurality of input pins for connecting additional sensors to the sensing device.

An example of a sensing device 10 with a housing is shown in FIG. 2a. In the example shown in FIG. 2a, the communication port 22 is an Ethernet port, and the power supply is a power adapter 24 for receiving power from a wall outlet. FIG. 2b illustrates a circuit board including a plurality of input pins 19 for connecting additional sensors to the sensing device.

Figure 3:
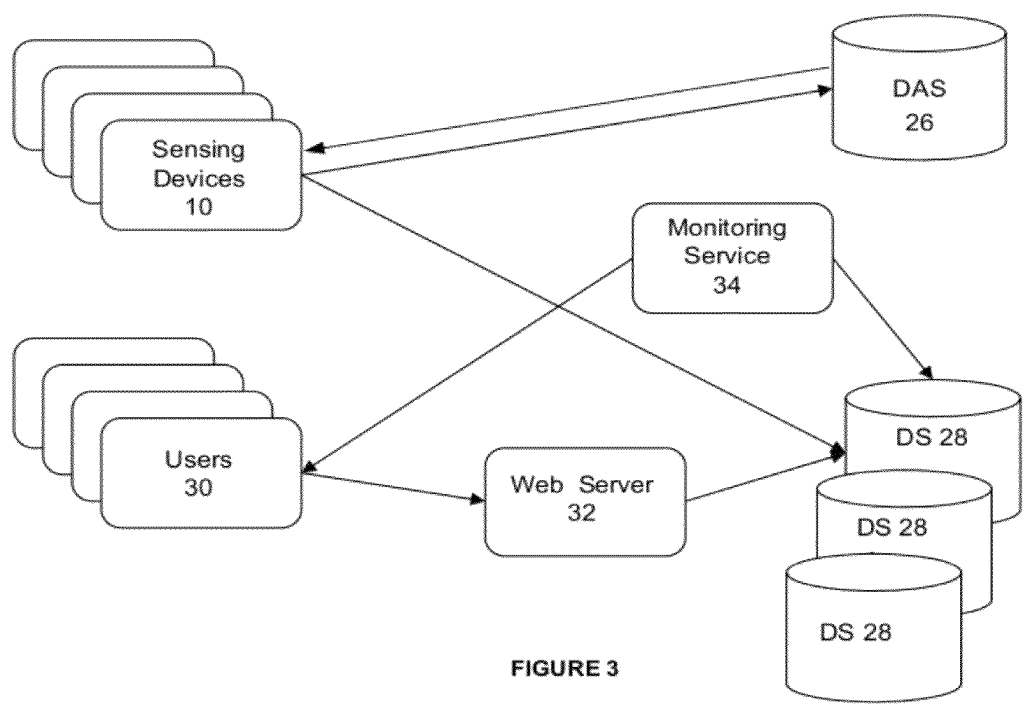
FIG. 3 illustrates an exemplary system for remotely monitoring the physical parameters in a measurement site using a sensing device in accordance with the present embodiments.

FIG. 3 illustrates an exemplary system for remotely monitoring the physical parameters in a measurement site using a sensing device 10 in accordance with the present embodiments. In an embodiment, the sensing device 10 may be automatically configured when powered on, whereby unsophisticated users may install the sensing device 10 at the measurement site without the need of a technician.

The sensing device 10 may be customized to the needs of the user, whereby the user may preselect the type and number of sensors 12 to include in the sensing device 10. The circuit board of the sensing device 10 may include a plurality of inputs 19 for adding/installing more sensors 12, as shown in FIG. 2b. In an embodiment, when the user purchases the sensing device 10, the customer service will register the sensing device and link it to the user's profile. The sensing device 10 is associated to a specific Data Server (DS) 28 from a plurality of available data servers 28. The address of the DS 28 assigned to the sensing device 10 is registered in the Dynamic Address Server (DAS) 26. Because the sensing devices do not all include the same sensors, and the sampling frequency for each device may vary between users, customized configuration settings corresponding to each sensing device 10 are created and sent to the DS 28. All that is required for installing the sensing device 10 at the measurement site is to plug the sensing device 10 in the internet and power it on. In the case where the communication port is a Wi-Fi, the Wi-Fi information can be configured by the user via a configuration interface.

In operation, when an internet connection is provided at the communication port 22 of the sensing device 10, and the device is powered on, the sensing device 10 sends a configuration request to a remote DAS 26. The DAS 26 contains a look-up table associating each sensing device 10 with a DS 28. The address e.g. domain name, of the DAS may be pre-stored in the memory 20 of the sensor device 10 so that the sensing device 10 may initialize the configuration automatically as soon as it is powered on.

The DAS 26 provides the sensor device 10 with the address of the DS 28. The sensing device contacts the DS 28 to obtain the configuration settings including the sample refresh time and firmware revision, sensor status (active/inactive), and alarm definitions. The sensing device contacts the DS 28 periodically to check whether the settings have changed.

In cases where a user wants the measurement data to be sent to a database of his own (for security and/or confidentiality reasons etc.), the address of the user's database would be recorded in the DAS and the sensing devices associated with that user would be linked to that address. Furthermore, by having all sensing devices pass through the DAS, it would be possible to have control of the sensing devices currently operating, and to use this information for billing services and account management. Moreover, when the number of the sensing devices increases beyond the capacity of a certain DS, it would be possible to use further DSs for data storage.

When the configuration settings are received at the sensing device 10, the latter uses the sample refresh time to determine the sampling frequency for the measurement data received from the sensors 12. A sampler module is implemented in processor 16. The sampler records all active sensor values at the frequency selected by user and stores them in a FIFO with timestamp and with an alarm status. This way, the settings of the sensing device 10 may be adjusted remotely to suit different types of applications. More particularly, the user may remotely increase or decrease the time between two samples depending on the need.

The measurement data received from the sensors is sampled using the sampling frequency, and the samples (aka measurement data) are stored in the memory 20 temporarily for transmission to the appropriate DS 28 with which the sensing device 10 is associated. The measurement data is sent to the DS 20 every time a sample is taken. In an embodiment, the samples are accumulated in the internal memory 20 in the case where the connection with the DS 20 is lost, as will be described below. In an embodiment, the measurement data is erased from the internal memory only after a confirmation of receipt is received from the DS 28.

The present embodiments make the measurement data stored in the DS 28 available to the users 30 via the internet using a web server 32 or any similar means. At no time will the user connect to the sensing device 10 directly to obtain the measurement data. Thereby, simplifying the microcontroller 16 and microcontroller software by eliminating the need to have server features in the sensing device, such as router port forwarding, domain name configuration, etc. Accordingly, the sensing devices are only a client in a network perspective. In other words, the present embodiments have the advantage of avoiding the provision of a web server in the sensing device and also preventing the sensing device from acting as a server itself.

Furthermore, this design eliminates the need to have a large memory to store the measurement data in, thereby reducing the price and the overall size of the sensing device 10, due to the reduction in circuit board area. Compared to the conventional systems, the reduction in memory size in the sensing device 10 is quite substantial especially when the measurement data needs to be stored for long periods of time.

Consider the case where the measurement data of a measurement site is needed for three months for a sampling frequency of one sample every 10 minutes. If the minimum memory capacity required in a conventional system is X bytes, the minimum memory capacity required in a sensing device according the present embodiments would be X/(3 months*30 days*24 hours*6 samples per hour)=X/12960 times. Therefore, the reduction in memory size provided by the sensing device 10 in this exemplary scenario is 12960 times. Of course, this number increases with the period of storage and the sampling frequency.

Referring back to FIG. 3, a monitoring service 34 may be provided for monitoring the measurement data received at the DS 28. The monitoring service 34 may send an alarm message to the users 30 if a measurement exceeds a predefined threshold for a predefined period. For example, if the temperature rises beyond a certain threshold, an alarm is sent to the user 30 to alert them of the situation. Also, if a certain time elapses past the last measurement received without receiving a new measurement, the monitoring service 34 may also send an alarm to the user 30 indicating that the sensing device sends no more data. This problem can be caused by a network failure or an electric failure.

In an embodiment, when a loss of connection occurs between the sensing device 10 and the DS 28, the sensing device 10 may store the measurement data temporarily in the internal memory 20 for transmission to the DS 28 when the connection is re-established. Based on the size of the internal memory 20, the number and type of sensors 12, and the sampling frequency of each sensor, the monitoring service 34 may determine the time limit during which the measurements can be taken and stored in the internal memory 20 before reaching the storage limit. The monitoring service 34 may include this time limit in the alarm sent to the user so that the user can take the appropriate action before losing measurement data. The alarm message may be sent as an email, SMS, or even through in an automated phone call or voice message.

Figure 4:
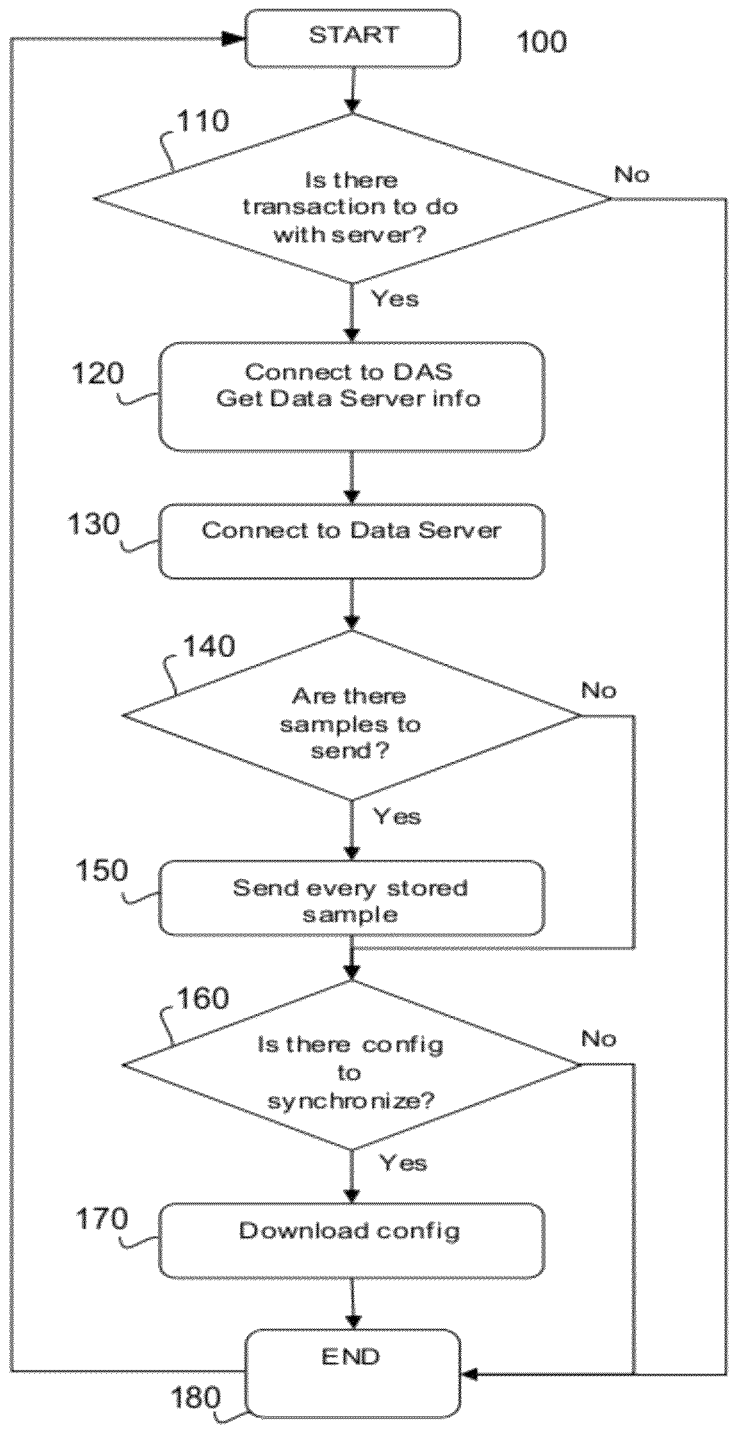
FIG. 4 is a flowchart illustrating the automatic configuration steps of the sensing device 10, in accordance with an embodiment.

FIG. 4 is a flowchart illustrating the automatic configuration steps of the sensing device 10, in accordance with an embodiment. The configuration starts at step 100 e.g. the device is powered on. At step 110, the sensing device 10 decides if there is a transaction to do with the server. If yes, the process proceeds to step 120 to connect to the DAS 26 server to obtain the address of the DS 28. At step 130 the sensing device 10 connects to the DS 28. If, at step 140, the sensing device 10 finds that there are samples to send, the system proceeds to step 150 to send all the samples to the DS 28. If there are no samples, the sensing device 10 checks whether there are new configurations to synchronize, at step 160. If yes, the system downloads the configurations at step 170. Otherwise, the process ends, and a new loop starts.

A communication module is implemented in the microcontroller 16. The communication module manages the transactions with database. In summary, these transactions include:
b) Configuration Synchronization (one way transfer: from the DS to the sensing device)
The sensing device must synchronize its internal configuration with the DS 28 because its configuration can change. Here are main configuration parameters:
Sample refresh time;
Firmware revision;
Alarm definitions;
Sensor status; and
Clock.
c) Sample Sending
When there are stored samples in a buffer, the sensing device sends them to the DS 28.
d) Firmware Upgrade
When there is a new firmware version, the sensing device downloads it and installs it.

Figures 5, 6A:
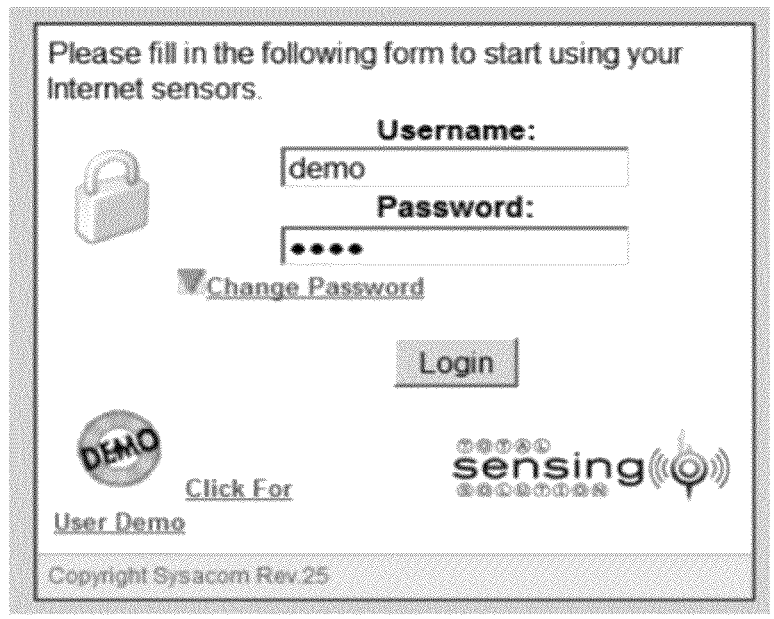
FIG. 5 illustrates an example of an authentication page when the user requests access to the measurement data stored in the DS.
FIG. 6a illustrates a sensing device information access page.
Figure 6B:
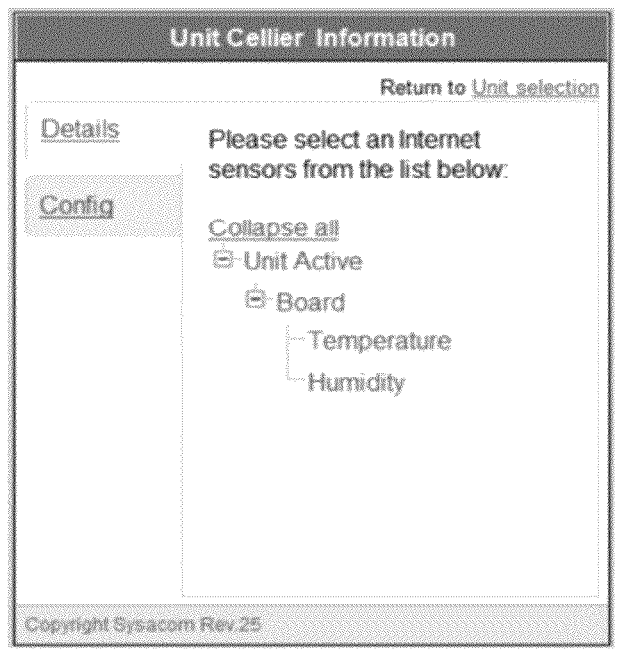
FIG. 6b illustrates a list of sensing devices associated with a user's profile.
Figure 7A:
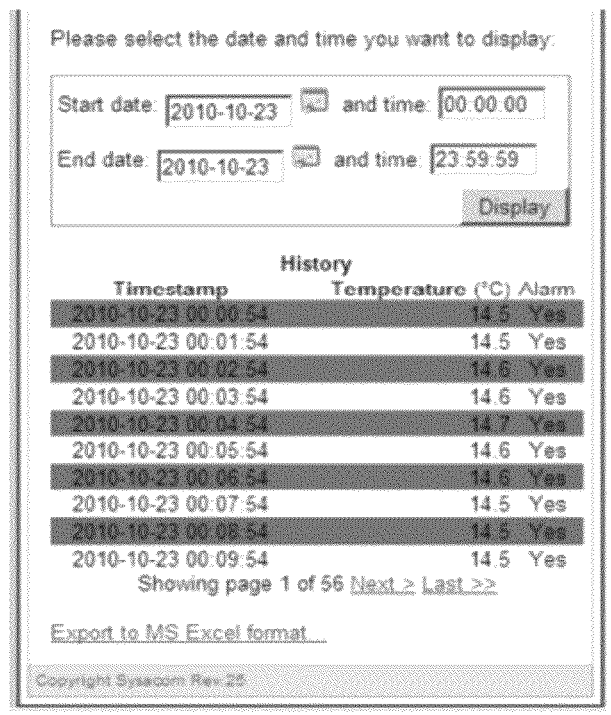
FIGS. 7a and 7b illustrate different types of data presentations.
Figure 7B:
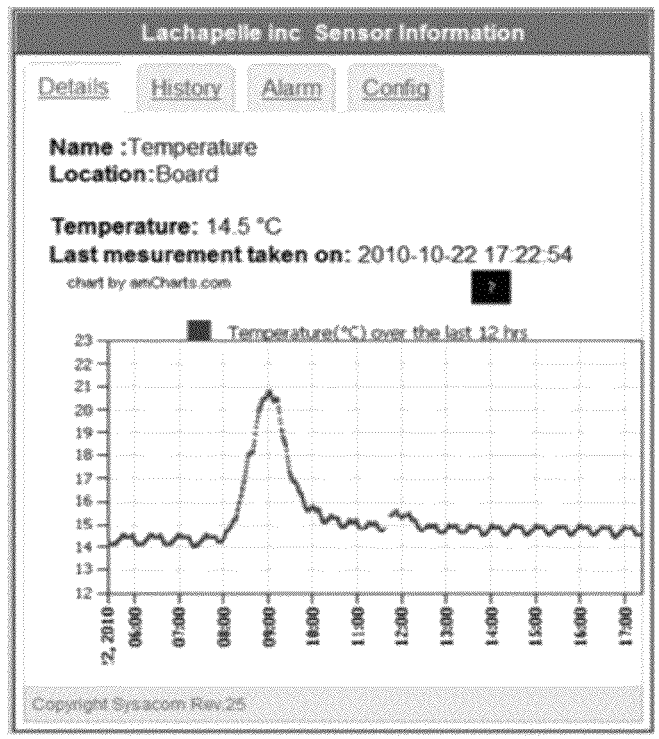

In an embodiment, the user may access the data stored in the DS 28 though the internet by requesting a specific webpage. A user profile may be created to which, one or more sensing devices 10 may be associated. When accessing the webpage, the user is faced with an authentication page as shown in FIG. 5. FIG. 6a illustrates a sensing device information access page. After authentication, the user may select one or more sensing devices 10 and view the measurement data of each sensor in each sensing device 10. FIG. 6b illustrates a list of sensing devices associated with a user's profile As shown in FIG. 7a, the user may select to view the measurement data of a certain period of time by selecting the start date and end date of that period. The user may select the type of presentation for the data such as a numerical presentation as shown in FIG. 7a, or a graphical representation such as that shown in FIG. 7b. Other types of presentations may be also be used without departing from the scope of the disclosure.

The measurement data may also be processed, to generate warnings indicating that the data is following a certain trend and based on that trend, it is expected that a certain parameter will exceed the threshold within a certain period of time. For instance, if the temperature in the measurement site is rising one degree each month, the system may determine the number of months left before that the temperature reaches the predefined threshold, and will send a warning to the user to alert them of the situation. Warnings are based on predictions and they are not as urgent as alarms, because they provide the user with longer periods of time to investigate/fix the situation.

Figure 8:
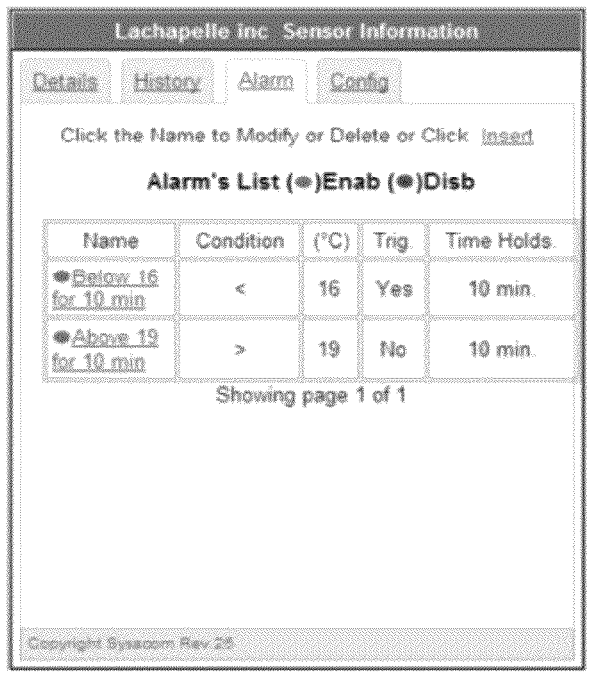
FIG. 8 illustrates an example of alarm settings which are adjustable by the user.

Additionally, the user may customize the alarms by specifying the upper and lower thresholds of the measurement data and the type of message in which the alarm is to be sent, as shown in FIG. 8.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. An auto-configurable sensing device for sensing at least one parameter in a measurement site, said device comprising:
   at least one un-configured sensor for sensing a parameter of the measurement site;
   a communication port;
   a memory having recorded thereon an address of a first server; and
   a processor having access to statements and instructions which when executed, cause the processor to:
   a. automatically contact the first server requesting an address of a second server other than the first server, via said communication port;
   b. contact the second server requesting configuration settings for each one of the at least one un-configured sensor;
   c. install said configuration settings;
   d. sample, based on the configuration settings, measurement data received from said at least one sensor; and
   e. send sampled measurement data to said second server for storage.

2. The sensing device of claim 1, wherein the communication port is one of Ethernet port, and a Wi-Fi port.

3. The sensing device of claim 1, wherein the configuration settings include a sampling frequency used for sampling an output of the at least one sensor.

4. The sensing device of claim 3, wherein the configuration settings further include firmware configuration of the sensing device.

5. The sensing device of claim 1, wherein the at least one sensor includes at least one of temperature sensor, pressure sensor, humidity sensor, radiation sensor, luminosity sensor, contact sensor, and toxic gasses sensor.

6. The sensing device of claim 3, wherein sending the sampled measurement data is performed each time sample measurement data is taken at the measurement frequency.

7. The sensing device of claim 1, wherein the sensing device contacts the second server periodically for verifying the presence of newer configuration settings.

8. The sensing device of claim 1, wherein the first server selects the second server from a list including a plurality of second servers.

9. The sensing device of claim 8, wherein the sensing device is pre-assigned to one of the plurality of second servers.

10. The sensing device of claim 1, wherein the sensing device acts as a client element in a communication network connecting the first server, the second server and the sensing device.

11. A sensing device, comprising:
    at least one sensor for sensing a parameter of the measurement site;
    a memory having recorded thereon an address of a first server;
    a communication port; and
    an auto-configurable processor adapted to
    a) automatically contact the first server, though said communication port, requesting an address of a second server other than the first server,
    b) download and install configuration settings for each one of the at least one sensor from the second server, said configuration settings including sampling frequency;
    c) sample, based on said sampling frequency, measurement data received from said at least one sensor; and
    d) send sampled measurement data to said second server for storage.

* * * * *